United States Patent
Kan et al.

(10) Patent No.: US 6,748,399 B1
(45) Date of Patent: Jun. 8, 2004

(54) PERFORMANCE-BASED EXPERT WITNESSING

(75) Inventors: Flora Kan, Potomac, MD (US); David Kan, Potomac, MD (US); Andrei Kitchaev, Rockville, MD (US)

(73) Assignee: Data Unlimited International, Inc., Gaithersburg, MD (US)

( * ) Notice: Subject to any disclaimer, the term of this patent is extended or adjusted under 35 U.S.C. 154(b) by 440 days.

(21) Appl. No.: 09/852,452

(22) Filed: May 10, 2001

Related U.S. Application Data

(60) Provisional application No. 60/211,283, filed on Jun. 13, 2000.

(51) Int. Cl.[7] .................................................. G06F 7/00
(52) U.S. Cl. .................... 707/104.1; 707/100; 707/200; 707/204; 705/1
(58) Field of Search .............................. 707/100–104.1, 707/1–10, 200, 204; 705/1

(56) References Cited

U.S. PATENT DOCUMENTS

| | | | | |
|---|---|---|---|---|
| 5,444,615 A | * | 8/1995 | Bennett et al. ................. | 705/8 |
| 5,815,392 A | * | 9/1998 | Bennett et al. ................. | 705/8 |
| 5,940,800 A | * | 8/1999 | Bennett et al. ................. | 705/1 |
| 6,098,070 A | * | 8/2000 | Maxwell ..................... | 707/102 |

OTHER PUBLICATIONS

U.S. patent application Ser. No. 60/211,283, Kan, filed Jun. 13, 2000.
U.S. patent application Ser. No. 09/754,425, Kan, filed Jan. 4, 2001.

* cited by examiner

Primary Examiner—Greta Robinson
Assistant Examiner—Zinh Black

(57) ABSTRACT

DNA scientific evidences include analysis fact, principles, theories, and underlying data. Courtroom admissibility of DNA scientific evidence requires courts to scrutinize their quality and suitability. Expert witnesses must collect, understand science, and apply to the facts of the case. To uniformly and comprehensively present DNA scientific evidence generated by paper-based casework has been time-consuming, erroneous, and personal chores because of vast paper volume; the degree of courtroom admissibility is arbitrary assessment among courtroom parties. The inventive method employs computer network to gather DNA scientific evidence and retain them using Electronic Case Folder (ECF), database categorizing DNA scientific evidence in defined sequence with page number and time stamp. The goals of invention relates generally to courtroom admissibility, but specifically to presenting DNA scientific evidence based upon goals of DNA case and to enabling justice system to determine fact and legal issue using documenting, evaluating, and learning tool of ECF.

2 Claims, 2 Drawing Sheets

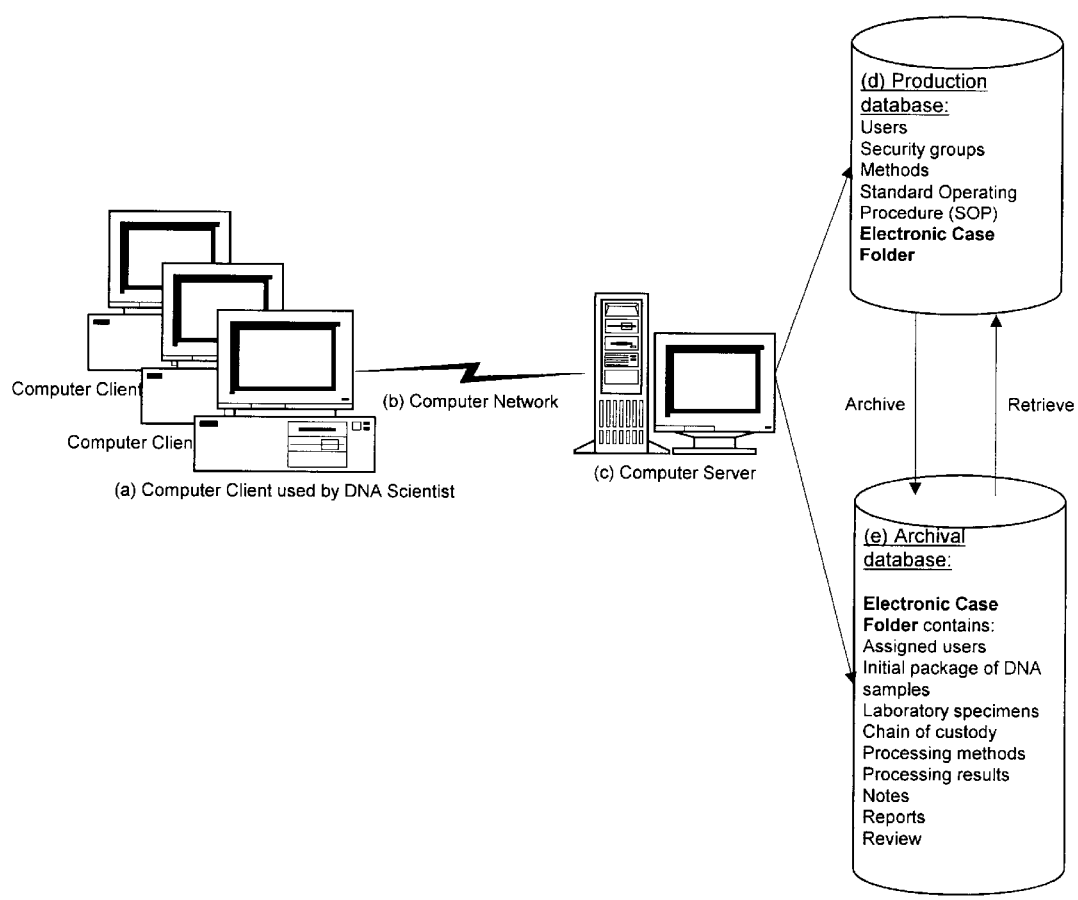
Figure 1 Architectural scheme of Performance-based Expert Witnessing

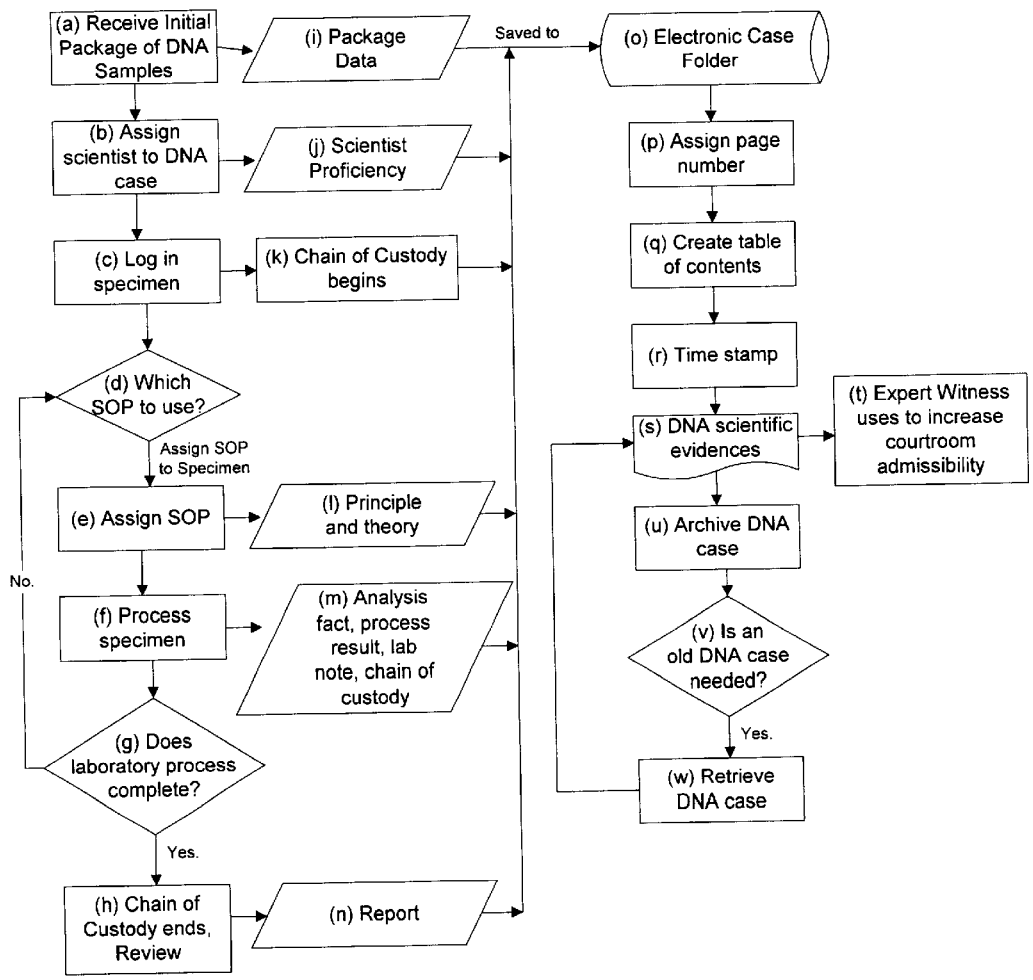
Figure 2 Design and function of the Electronic Case Folder

PERFORMANCE-BASED EXPERT WITNESSING

CROSS-REFERENCE TO RELATED APPLICATION

This application claims the benefit of Provisional Application No. 60/211,283 filed Jun. 13, 2000.

STATEMENT REGARDING FEDERALLY SPONSORED RESEARCH AND DEVELOPMENT

Not applicable.

REFERENCE TO A MICROFICHE APPENDIX (USED WHEN A COMPUTER PROGRAM LISTING IS PROVIDED IN A MICROFICHE APPENDIX)

Not applicable.

BACKGROUND OF THE INVENTION

The means of making physical evidence proof is forensic science—the application of science to legal processes, the application of science to crime fighting. The defense attorneys may persuade juries to find reasonable doubt, and suspects who had credible alibis. However, the physical evidence, DNA, is the silent, definite witness. Heralded as the most powerful and discriminating method of identifying the source of biological evidence available to the criminal justice system, forensic DNA testing has evolved both in the technologies it uses and its principles and theories to promote the reliability and courtroom admissibility. The development of DNA technology furthers the search for truth by helping police and prosecutors in the fight against the crime. Increasingly accepted, DNA technology is now widely used by police, prosecutors, defense counsel and courts in the United States.

To ensure the courtroom admissibility, DNA scientific evidence involves two general considerations: the acceptance of the science itself, called scientific validity, and the proficiency of expert witness. Furthermore, DNA scientific evidence must includes the analysis fact, principles, theories and the underlying data. Scientific facts, principles, and theories are presented and explained to the jury through expert testimony. Expert witnesses testify according to the Rules of Civil Procedure. Judges determine the scientific validity of scientific facts, principles, and theories. Judges are the gatekeepers to eliminate expert witnesses whose work is not scientific, peer reviewed, published, tested, or subjected to normal scientific scrutiny.

Forensic DNA testing properly applied is generally accepted as admissible under Frye18 or Daubert19 standards. As stated in the National Research Council's 1996 report on DNA evidence, "The state of the profiling technology and the methods for estimating frequencies and related statistics have progressed to the point where the admissibility of properly collected and analyzed DNA data should not be in doubt." According to the Case Studies in Use of DNA Evidence, 46 States admit DNA evidence in criminal proceedings. In 43 States, courts have ruled on the technology, and in 3 States, statutes require admission. DNA Evidence Admission in Criminal Trials by State is as follows:

| State | DNA Admitted |
| --- | --- |
| Alabama | Yes |
| Alaska | Yes |
| Arizona | Yes |
| Arkansas | Yes |
| California | Yes* |
| Colorado | Yes |
| Connecticut | Yes |
| Delaware | Yes |
| Florida | Yes |
| Georgia | Yes |
| Hawaii | Yes |
| Idaho | Yes |
| Illinois | Yes* |
| Indiana | Yes |
| Iowa | Yes |
| Kansas | Yes |
| Kentucky | Yes |
| Louisiana | Yes |
| Maine | No |
| Maryland | Yes* |
| Massachusetts | Yes |
| Michigan | Yes |
| Minnesota | Yes |
| Mississippi | Yes |
| Missouri | Yes |
| Montana | Yes |
| Nebraska | Yes |
| Nevada | Statute |
| New Hampshire | Yes |
| New Jersey | Yes* |
| New Mexico | Yes |
| New York | Yes |
| North Carolina | Yes |
| North Dakota | No |
| Ohio | Yes |
| Oklahoma | Statute |
| Oregon | Yes |
| Pennsylvania | Yes |
| Rhode Island | No |
| South Carolina | Yes |
| South Dakota | Yes |
| Tennessee | Statute |
| Texas | Yes |
| Utah | No |
| Vermont | Yes |
| Virginia | Yes |
| Washington | Yes |
| West Virginia | Yes |
| Wisconsin | Yes |
| Wyoming | Yes |

*Decision by Intermediate Court of Appeals

The courtroom admissibility of the DNA scientific evidence requires that courts scrutinize the proposed testimony to determine its suitability for use at trial. It is the responsibility of the litigators to help the trier of the fact to recognize the basis and reliability of the experts' opinions.

The problems are that in a jury trial, the judge determines legal issues, and the jury determines the facts; in a non-jury trial, the judge determines both. The jury system relies on the common sense of the individual juror to balance the rational and emotional content of the information presented by the parties by comparing it on the basis of their personal life experience and their personal balance of rational and emotional factors.

As used in the legal phrase "finding of facts and conclusions of law," the term "fact" does not refer to the actual, underlying facts, but only to those facts that were presented by the parties as admissible evidence at trial. The judge uses these facts to make decisions.

Close cooperation between litigators and experts is crucial, because the litigators must determine what scientific information a party presents, and the expert determines how to explain it.

Thus, the expert witness needs not only understand the science that they wish to present, but they should be able to apply it to the facts of the case, understand the needs and viewpoint of their audience, translate scientific facts and opinions accurately from professional scientific terminology so that the trier of fact will comprehend it, and recall the testimony at the time of the decision making.

The underlying definition of the expert witness is provided in Sections 702 of the Federal Law of Evidence and in the corresponding definitions of the Law of Evidence in every State: (Revised) Rule 702. Testimony by Experts (Revised Aug. 8, 1998, by the National Commission on Uniform State Laws, and submitted to the Federal Judicial Council). If scientific, technical, or other specialized knowledge will assist the trier of fact to understand the evidence or to determine a fact at issue, a witness qualified as an expert by knowledge, skill, experience, training, or education, may testify thereto in the form of an opinion or otherwise.

(a) General rule. A witness may testify in the form of opinion or otherwise if the following are satisfied.
  1. Basis for testimony. The testimony is based on scientific, technical, or other specialized knowledge.
  2. Assistance to trier of fact. The testimony will assist the trier of fact to understand evidence or determine a fact at issue.
  3. Qualification of witness. The witness is qualified by knowledge, skill, experience, training, or education as an expert in the scientific, technical, or other specialized field.
  4. Reasonable reliability. The testimony is based upon principles or methodology which is reasonably reliable as established under subdivision (b), (c), or (e).
  5. Reliably applied to facts of case. The witness has applied the principles or methodology reliably to the facts of the case
(b) Reliability deemed to exist. A principle or methodology is deemed reasonably reliable if its reliability has been established by controlling legislation or judicial decision.
(c) Presumption of reliability. A principle or methodology is presumed to be reasonably reliable if it has substantial acceptance within the relevant scientific, technical, or specialized community. A party may rebut the presumption by proving that it is more probable than not that the principle or methodology is not reasonably reliable as provided in subdivision (e).
(d) Presumption of unreliability. A principle or methodology is presumed not to be reasonably reliable if it does not have substantial acceptance within the relevant scientific, technical, or specialized community. A party may rebut the presumption if it is more probable than not that the principle or methodology is reasonably reliable as provided in subdivision (e).
(e) Other reliability factors. When determining the reliability of a principle or methodology, the court shall consider all relevant additional factors, which may include:
  1. Testing. The extent to which the principle or methodology has been tested;
  2. Research methods. The adequacy of research methods employed in testing the principle or methodology;
  3. Peer review. The extent to which the principle or methodology has been published and subjected to peer review;
  4. Rate of error. The rate of error in the application of the principle or methodology;
  5. Experience of expert. The experience of the witness as an expert in the application of the principle or methodology; and
  6. Acceptance within the field. The extent to which the field of knowledge has substantial acceptance within the relevant scientific, technical, or specialized community.

Expert witness needs to be able to communicate with at least five types of audiences: their clients' attorneys, the opposing attorneys, the judge, the jury and with other experts for both sides. The present situation could be improved if professional experts would put more emphasis on scientific content than on adversarial rhetoric, and if counsel would more frequently use active scientists as scientific experts and for evaluating expert reports rather than specialists in persuasion.

Additionally, during a trial and the deliberations that follow it, jurors have two tasks: to understand and to evaluate the evidence. The jurors are expected to learn new information under the adverse conditions in a limited amount of time. The information is presented in a question and answer format between the attorney and the expert or witness, and the jurors are only observers of the interchange. They are not allowed to ask questions and may not be allowed to take notes. If a juror does not understand the information, did not hear something, or lost the train of thought, there is no opportunity to let the witness or attorney know. The information will be lost unless it is repeatable.

Expert witness must understand the science and apply to the facts of the case and to repeat DNA scientific evidence. These cover sample management, chain of custody, protocols, forms, laboratory casework, test results, quality issues, data interpretation, proficiency of laboratory scientists, security, privacy, review, reporting and archival. Errors include but not limited to incomplete chain of custody, wrong tests, scheduled procedure not performed, no testing chronology, no details of supervisory oversight, no signature, wrong samples used to test, samples contaminated or damage, improperly stored/handled, sample lost, test failure and lost/erased casework documents. DNA scientific evidence shall be collected and preserved from contamination. Most importantly, they shall be preserved from the DNA of the known blood sample of the defendants taken from them while in custody. To correctly, uniformly and repetitively validate and present DNA scientific evidence becomes difficult, time-consuming and personal chores. The degree of the admissibility of DNA scientific evidence becomes arbitrary assessment among the forensic community.

The proposal goal relates generally to courtroom admissibility, but specifically to electronic quality system to monitor and track where, who and when the quality deteriorates in forensic DNA laboratories.

Therefore, the invention provides a method to well structure DNA scientific evidence to reliably validate and to repetitively and systematically perform the following tasks:
Identify the issues
Provide relevant scientific information
Identify the relevant facts for the Jury
Provide opinions
Explain the basis of the opinions
Identify disagreements with the opposing opinions
Build credibility This invention relates generally to the presentation contents of a courtroom testimony. The invention specifically enables an electronic record management (ERM) to reproduce the DNA scientific evidence to educate the litigators, to research the underlying facts, to re-construct the processes, to assert the reliability and credibility and to standardize the interface between the expert witnesses and the litigators.

SUMMARY OF THE INVENTION

It is an object of the present invention to provide a method to create and reproduce the DNA scientific evidence for the courtroom testimony. In order to achieve this object, the invented method involves both specially designed computer network architecture that includes at least a computer server and at least a computer client, and the software to execute on every computer client.

The design and function of the server and client software are based on the conception of Electronic Case Folder (ECF)—the organization of forensic DNA laboratory data in a logical sequence. ECF allows to store data and data processing information—who, where, when, how and what was performed on data addition or modification. This conception is realized in both database design and application's business rules that are generally implemented in a graphical user interface. ECF data are: initial package of forensic DNA samples, laboratory specimens, chain of custody, processing methods, Standard Operating Procedure (SOP), processing results, notes, reports and peer reviews. SOP is set of instructions of which text is for laboratory scientists and directives are commands to issue to computer. Major features of the ECF are the access rules, the rule of data classification, the rule of numerating ECF contents, the rules of the content modification and the rules of the data archiving/retrieving.

ECF archival and retrieval completes the life cycle of electronic records and enable the reproduction of forensic DNA scientific evidence.

The computer server has two databases—the production database and archival database. Both databases have the same data structure in those parts concerning the ECF of the DNA scientific evidence, i.e. the informational schemas of the ECF are identical in both production and archival databases. The computer server performs the operations of data archiving and retrieving upon the request of the computer clients. Computer server is able to authenticate computer clients and to provide their interaction with the production database.

The computer client has user interface to allow users to log in and to be authenticated by the computer server. The user interface enables the collection of the DNA scientific evidence in integral, traceable, searchable and auditable form. It provides means to search, sort and analyze forensic DNA scientific evidence.

Further in accordance with this invention, user interface provide means to select the ECF of the DNA scientific evidence to archive or extract and then to initiate the server procedures of data archiving to or retrieving from the archival database.

Still further in accordance with this invention, the user interface allows to select and generate the printed output of text, number and images from the content of ECF for the courtroom testimony.

OBJECTS AND ADVANTAGES OF THE INVENTION

The primary object of this invention is to provide a method that enables the creation and the reproduction of forensic DNA scientific evidence to standardize the presentation of the courtroom testimony.

Other objects that this invention accomplishes:
1. Create the basis for testimony;
2. Provide validation method;
3. Facilitate trier to understand the DNA scientific evidence;
4. Qualify the knowledge, skill, experience and interpretation;
5. Define the reasonable reliability of the DNA scientific evidence;
6. Assist trier to apply the defined reliability of the DNA scientific evidence to the facts of the case;
7. Increase courtroom admissibility of forensic DNA scientific evidence;
8. Archive digital DNA case permanently.

Advantages
1. Document the research methods in testing the principle and methodology;
2. Establish a standard for the quality assurance that validates the scientific work;
3. Define goals, objectives, rules and procedures involving testing and modeling;
4. Evaluate and determine the performance and outcome of the research methods, the standard, goals, objectives, rules and procedures;
5. Enable the scientific work to abide by regulation;
6. Enable the repeatability of the scientific work;
7. Enable the design of the research methods, the standard, goals, objectives, rules and procedures to achieve the purposes of cost savings, risk management, safety, and quality.

Further objects and advantages of this invention will become apparent from a consideration of the drawings and ensuing description.

BRIEF DESCRIPTION OF THE DRAWINGS

FIG. 1 Architectural scheme of Performance-based Expert Witnessing depicts the settings and relationship among computer network, databases and data communication.

FIG. 2 Design and function of the Electronic Case Folder is a flowchart illustrating how to create Electronic Case Folder.

DESCRIPTION OF THE INVENTION

The inventive computer-aided method is based on both the client-server architecture (FIG. 1) and the specially designed software that includes two relational databases ((d) and (e) in FIG. 1) running on a computer server ((c) in FIG. 1) and software to execute on a computer client ((a) in FIG. 1).

A computer server ((c) in FIG. 1)) is to authenticate computer clients ((a) in FIG. 1) and exchange data via a computer network ((b) in FIG. 1). It includes a production database ((d) in FIG. 1) that stores the work data of in-progress and an archival database ((e) in FIG. 1) of which the purpose is to store the completed un-modifiable data. Relational production and archival databases can be implemented using commercially available database management systems. Both databases have the same data schema and structure in those parts concerning Electronic Case Folder (ECF) of the DNA scientific evidence. The server software includes the stored procedures initiated upon clients' requests for the migration of the completed un-modifiable data between two databases that are referenced as Production database ((d) in FIG. 1) and archival database ((e) in FIG. 1). That is duplication of the data from production database to the archival one and the subsequent removal of initial data from production database ((d) in FIG. 1). Retrieving is the reverse process of duplication of data from the archival database ((e) in FIG. 1) to the production one less the removal of the data from archival database.

Common graphic user interface is another part of the specially designed software that has to be executed on computer clients ((a) in FIG. 1) to facilitate the operations of the invented method. It allows the laboratory scientists to log in and to be authenticated by the computer server ((c) in FIG. 1). The user interface allows the interaction with the server software supporting dataflow mutually and standard database procedures including data adding, editing, filtering and search.

In order to be irrefutable, DNA scientific evidence shall include not only the proficiency qualification of experts, who analyzed the research data, but also all the case related information. The conception of Electronic Case Folder (ECF) introduces the informational schema that allows to store, archive, retrieve, and represent DNA case data collected in their integrity (FIG. 1). ECF contains the following interrelated data ((e) in FIG. 1):

Initial package of DNA samples;
Laboratory specimens;
Chain of custody;
Processing methods;
Processing Results;
Notes;
Reports, and
Peer reviews.

The main features of Electronic Case Folder (ECF) are:

The access to every user to any of ECF is based on the individual user assignment in terms of security and tasks;

Every recorded operation pertaining to DNA samples or laboratory specimen (such as initial checking-in, transferring to another person or organization, laboratory caseworking etc.) forms the chain of custody that is the part of the ECF content;

Processing results is entered into ECF only in that form and the sequence. This is determined by the approved Standard Operating Procedure (SOP) assigned to DNA samples and laboratory specimens (refer to U.S. patent application Ser. No. 09/754,425);

ECF is archived or retrieved as a single whole. No data of the ECF can be exchanged between the production and archival databases individually;

Users place or order data in user-defined sequence;
ECF contents has computer server time stamp;
ECF contents has page numbers;
ECF has a table of contents.

The invented method uses two-level management of the user's security access. At the first level, the access rights of security groups ((d) in FIG. 1) to which users belong to determine the user's access to data and the users' rights to modify data. At the second level, the user rights to access and modify ECF contents are determined by the personal case assignment. Exemption of the rule for the second level is the one special group of users that are "Case managers" or "Case administrators", who are able to create new DNA case and to change users' assignments.

FIG. 2 illustrates a method to collect, store, manage, and produce DNA scientific evidence to be used by expert witness. The operation is as follows:

1. Receive initial package acceptance of DNA samples, and this operation generates package data (shown as (a)); this operation generates package data (shown as (i));
2. Assign scientist to this DNA case and generate the scientist's proficiency record (shown as (b)); this operation generates scientist's proficiency data (shown as (l));
3. Log in the specimen and chain of custody starts with this scientist; chain of custody record is created (shown as (c)); this operation begins tracking of chain of custody (shown as (k));
4. Determine which SOP to use (shown as (d));
5. Follow the designated SOPs (shown as (e)); SOPs are principle and theory applied to DNA case (shown as (l));
6. Process specimen (shown as (f)) and generate analysis fact, process result, laboratory note and chain of custody if the specimen is transferred (shown as (m);
7. Repeat Operation step from 4 to 6 until complete laboratory casework (shown as (g));
8. Review the case (shown as (h); chain of custody ends; reports are created (shown as (n));
9. Create a new ECF and save generated records in ECF (shown as (o)); ECF holds underlying data of DNA case;
10. Assign page number to the contents of ECF (shown as (p));
11. Generate table of contents of ECF (shown as (q));
12. Stamp computer server time (shown as (r));
13. Expert witness uses ECF to increase the courtroom admissibility of DNA scientific evidence (shown as (s) and (t));
14. Archive DNA case for permanent storage (shown as (u);
15. If an old DNA case is needed (shown as (v)), retrieve DNA case when it is needed (shown as (w)).
16. Repeat Operation step from 13 to 14.

As shown in FIG. 2 said above, the invented operation is divided into two categories: enter data and generate data programmatically. The creation of a new ECF (shown as (o)) must have unique identification number, and the assignment of scientists (shown as (b)). Next step is entering information about the initial package of DNA samples (shown as (a)) and other document or data included to this package. System allows adding of all information required for the unique identification of the package received by the laboratory and specimens included into this package, such as: dates, names of sender and delivery service, descriptions and images. Login of specimens into the system (shown as (c)) means the adding of information about what ECF the specimen belongs to and who is its current owner. This action creates the first member in the chain of specimen's custody (shown as (k)) and makes the given specimen available for further process. Login into the system should be repeated for every specimen included to the ECF.

The assigning of SOP (shown as (e)) defines the process of specimen and process sequence based upon principle and theory applied to DNA case (shown as (l)). Consequently, the methods used to get results are being uniquely linked to the specimens for further reports (shown as (n)). If the different scientists fulfill different steps of processing then changes of specimen's ownership are required. Specimen transferred from one scientist to another adds the next member to the chain of custody by using the mechanism of computer authentication and biometric device (shown as (m)).

The lab note (shown as (m)) has the purpose of storing the case related information on scientist's choice. Finally, the laboratory supervisors may review (shown as (h)) all information obtained from the specimens included to the ECF, add conclusions. If they find that the data are satisfactory, the case can be closed, i.e. unavailable for any modification, and the case is ready to archive (shown as (u)).

The reports generated from the contents of ECF (shown as (s)) depending on demand may include case related information fully or partially. During the performing of expert witness, data presented to the court can be proved and confirmed by mutual references. These presented data shall include analysis fact, principle, theory and underlying data in a consistent format. The format contains page number, table of contents, and time stamp (shown as (p), (q), and (r)). For example, the information about the specimen processing includes the methods, intermediate and final results, used laboratory equipment and chemicals, personnel and date/time data.

Thus, the invented method solves the task of collecting and systematization of all DNA scientific evidence in standard, traceable and searchable form allowing archival and retrieval exchange.

Advantages

From the description above, a number of advantages of the invention become evident:

1. Collecting and tracing DNA scientific evidence electronically overcome the limitation of paper-based operation. Paper-based operation is time-consuming and error-prone management of vast volume of physical paper correlated manually. The paper-based operation is limited to accessibility because paper information does not allow search, sorting, inquiry, and reporting at the electronic speed, precision and consistency. It is incapable of categorizing DNA scientific to standard and reproducible formats.

2. Basing upon principle and theory of DNA forensic science to execute electronic SOPs realizes understood science and to apply to the facts of DNA case. The scientific principles must be proven and accepted in the forensic and scientific community. The theories must be relevant to the issue before the court. The scientific principles and theories must be applied to the facts of the forensic DNA case and the inventive method provides sufficient TRUE data to support the application. These underlying TRUE data are collected, audited and secured in electronic database environment to preserve the TRUE data integrity.

3. Electronic Case Folder (ECF) centralizes the collection and categorization of DNA scientific evidence including TRUE analysis fact, generally accepted principle, relevant theory and underlying data. The standard format of ECF including page numbers, total page number, table of contents, and time stamp to present DNA scientific evidence enables expert witness to interpret fact of DNA case, and to translate scientific fact and opinion accurately. This invention improves the courtroom admissibility of DNA scientific evidence by providing computer real-time collected traceable scientific content.

4. This invention provides document tool of ECF to enable judge who determines legal issues in a jury trial and who determines facts and legal issues in a non-jury trail, jury who determines facts, to understand and to evaluate DNA scientific evidence. The jury system no longer needs to rely on common sense of the individual juror to balance the rational and emotional content of the information the parties by comparing it on the basis of jurors' personal life experience and their personal balance of rational and emotional factors. Jurors use ECF to gain educational and informative knowledge to evaluate the admissible DNA scientific evidence to make decision.

5. Further this invention complements juror' understanding and evaluating tool. Juror will be able to learn new information using ECF and no longer have to learn DNA scientific evidence under adverse conditions in a limited amount of courtroom time. DNA scientific evidence can be represented in electronic and reproducible format between attorney and expert witness. DNA scientific evidence will no longer be in a question and answer format between attorney and expert witness. Jurors can observe the interchange of information between attorney and expert witness at the courtroom and jurors can study and analyze the contents of ECF during defined time period. If a juror does not understand the information, jurors can let attorney or expert witness know based upon ECF.

Conclusion, Ramifications and Scope of Invention

Accordingly, the reader will see that Performance-based Expert Witnessing of this invention provides data acquisition tool to expert witnessing to collect TRUE DNA scientific evidence. The invention provides document tool to enable judge and juror to determine facts and legal issues using educational and informative information. The invention provides evaluating tool to juror to learn DNA scientific evidence in a defined time period in addition to the question and answer format between attorney and expert witness at courtroom. The scope of invention applies to Further the invention has the additional advantage in that:

1. It collects analysis fact and underlying data based upon principle and theory that are realized using electronic Standard Operating Procedure (SOP);

2. It permits monitoring and tracing of analysis fact and underlying data to reproduce the generating process of DNA scientific evidence; for example, a laboratory casework may be repeated to prove the proper preservation of DNA samples from contamination or to identify possible handling error;

3. It permits creation of electronic DNA scientific evidence to enable permanent digital archival and computational capability of searching, sorting, inquiring and reporting of DNA case; it eliminates paper-based operation;

4. It provides Electronic Case Folder of categorized DNA scientific evidence in consistent format to present at courtroom;

5. It enables justice system to standardize decision-making factors by providing higher quality documentation.

6. It allows demonstrating the full details of a laboratory's DNA scientific evidence to the public in a repeatable process and structure.

7. It overcomes the problems of pro prosecution bias, false testimony and inadequate laboratory casework.

8. It eliminates administrative tasks and errors of paper-based operation such as DNA case pulls and filing, errors of lost DNA case folders and other clerical mistakes.

9. It reduces transcription costs, lowers storage, copying expense, and labor costs compared with paper-based operation.

While the above description contains many specifications, these should not be construed as limitations on the scope of invention; rather as an exemplification of one preferred embodiment thereof. Many computer networks comprising computer servers, computer clients, data base management systems (DBMS) and Graphic User Interfaces (GUIs) can be designed to use the method of the invention. For example, the computer server can use different operating systems with various computer clients; using different computer programming languages can develop computer client user interface.

Accordingly, the scope of the invention should be determined not by the description of the invention, but by the claims and their legal equivalents.

What is claimed is:

1. A computer method for configuring a plurality of servers and user computers for systematizing deoxyribonucleic acid (DNA) scientific evidence data to provide substantial information of DNA to an expert witness at courtroom testimony, the method comprising:

configuring servers to:
  host a plurality of databases, including production and archival databases;
  collect said DNA scientific evidence data;
  store said DNA scientific evidence data including the operations of collection, archiving, retrieving and presentation wherein the scientists can testify analysis facts, theories, principle, or method, and wherein laboratory techniques used to obtain final results, joint by common informational schema allowing preserving integrity and proof of said DNA scientific evidence data;
  produce metadata and said DNA scientific evidence data contents;
  classify types of the DNA scientific evidence data;
  identify and authenticate computer users and scientists;
  query DNA scientific evidence data from said production database;
  replicate said production database to said archival database;
  communicate with a plurality of said computers requesting said DNA scientific evidence data;
  retrieve said DNA scientific evidence data from said archival database to said production database;
  select said DNA scientific evidence data to archive
  archive said DNA scientific evidence data in a format of integral secure databases;
  trace, audit, collect, and examine repetitively said DNA scientific evidence data wherein the scientists can re-open aged DNA scientific evidence data for further investigation or future court testimony;
allowing users on said user computers to:
  select said DNA scientific evidence data to archive;
  activate archiving execution;
  query said DNA scientific evidence data;
  compile contents of said DNA scientific evidence data according to scientists' design;
  relate or cross-reference said DNA scientific evidence data;
  search, sort, report, and analyze said DNA scientific evidence data including using the classified types of said DNA scientific evidence data;
  output said DNA scientific evidence data or select and generate the printed output of text, number and images from the content of from the content of Electronic Case Folder or the courtroom testimony;
  numerate said DNA scientific evidence data;
  retain intact said DNA scientific evidence data; and
  gain access to said aged DNA scientific evidence data online whereby scientists can examine, discover, and prove said DNA scientific evidence data, an expert witness can individualize said DNA scientific evidence data.

2. A system for configuring a plurality of servers and user computers for systematizing deoxyribonucleic acid (DNA) scientific evidence data to provide substantial information of DNA to an expert witness at courtroom testimony, the system comprising means to perform the method of claim 1.

* * * * *